United States Patent
Stimson et al.

(10) Patent No.: US 9,937,895 B2
(45) Date of Patent: Apr. 10, 2018

(54) METHOD AND APPARATUS FOR REMOTELY DISABLING VEHICLES

(71) Applicant: E2V TECHNOLOGIES (UK) LIMITED, Chelmsford, Essex (GB)

(72) Inventors: Gary Stimson, Lincoln (GB); Stuart Guy, Colchester (GB); Matthew Hicks, Braintree (GB)

(73) Assignee: E2V TECHNOLOGIES (UK) LIMITED, Chelmsford (GB)

( * ) Notice: Subject to any disclaimer, the term of this patent is extended or adjusted under 35 U.S.C. 154(b) by 0 days.

(21) Appl. No.: 15/124,987

(22) PCT Filed: Mar. 9, 2015

(86) PCT No.: PCT/GB2015/050675
§ 371 (c)(1),
(2) Date: Sep. 9, 2016

(87) PCT Pub. No.: WO2015/136252
PCT Pub. Date: Sep. 17, 2015

(65) Prior Publication Data
US 2017/0072905 A1 Mar. 16, 2017

(30) Foreign Application Priority Data
Mar. 10, 2014 (GB) .................................. 1404209.7

(51) Int. Cl.
*B60R 25/04* (2013.01)
*B60R 25/045* (2013.01)

(52) U.S. Cl.
CPC ............ *B60R 25/04* (2013.01); *B60R 25/045* (2013.01); *B60R 2025/0405* (2013.01)

(58) Field of Classification Search
CPC .................. B60R 25/04; B60R 25/045; B60R 2025/0405
USPC ............................................ 340/12.14–12.17
See application file for complete search history.

(56) References Cited

U.S. PATENT DOCUMENTS

| | | | | |
|---|---|---|---|---|
| 5,818,583 A * | 10/1998 | Sevick-Muraca | ...... | G01N 21/49 356/336 |
| 5,907,290 A | 5/1999 | Turner et al. | | |
| 5,952,600 A | 9/1999 | Herr | | |
| 6,442,371 B1 * | 8/2002 | Lyu | ........ | G01R 23/17 324/637 |
| 6,768,464 B1 * | 7/2004 | Shoji | ...... | H01Q 1/243 343/700 MS |

(Continued)

OTHER PUBLICATIONS

International Search Report and Written Opinion for PCT/GB2015/050675 dated May 28, 2015.

*Primary Examiner* — Allen T Cao
(74) *Attorney, Agent, or Firm* — Lando & Anastasi, LLP

(57) ABSTRACT

A vehicle disabling apparatus for remotely disabling a vehicle having an engine comprises a source (4) of high frequency energy for generating a high frequency signal and a modulator (1) for modulating the high frequency signal by applying an effects signals package. The effects signal package comprises a plurality of respective effects signals and each effects signal comprises a pulse train, the effects signals package being non-vehicle specific. An antenna (6) directs the effects signal package modulated signal at a remote vehicle to disrupt the vehicle engine by affecting the target vehicle engine management system.

40 Claims, 4 Drawing Sheets

(56) References Cited

U.S. PATENT DOCUMENTS

| | | | |
|---|---|---|---|
| 7,187,441 B1 * | 3/2007 | Sevick-Muraca | G01N 21/49 356/336 |
| 9,609,530 B2 * | 3/2017 | Lea | H04W 24/02 |
| 2008/0223641 A1 | 9/2008 | Elson | |

* cited by examiner

METHOD AND APPARATUS FOR REMOTELY DISABLING VEHICLES

RELATED APPLICATION

This application is a U.S. National Stage Application under 35 U.S.C. § 371 of International Application No. PCT/GB2015/050675, filed Mar. 9, 2015, which claims priority to United Kingdom Application No. 1404209.7, filed Mar. 10, 2014, which are hereby incorporated herein by reference in entirety.

FIELD OF THE INVENTION

This invention relates to a method and apparatus for remotely disabling vehicles.

BACKGROUND

There is a requirement to be able to stop vehicles for law enforcement or security purposes. This may be achieved by applying a lethal solution but it may not be the most desirable outcome and can result in injuries to bystanders, law enforcement officers and collateral damage.

One non-lethal solution is to deploy a mechanical device in the path of a target vehicle to damage its tyres but this can be dangerous for personnel and difficult to position.

In another solution, a high power broadband microwave/VHF source may be employed to direct an electromagnetic pulse at a target vehicle but due to the broadband nature of the signal, which may have little directivity, this could cause damage to vehicle and danger to occupants and bystanders, for example, people with pacemakers being particularly vulnerable.

BRIEF SUMMARY

According to a first aspect of the invention, a vehicle disabling apparatus for remotely disabling a vehicle having an engine comprises: a source of high frequency energy for generating a high frequency signal; a modulator for modulating the high frequency signal by applying an effects signals package, the effects signal package comprising a plurality of respective effects signals and each effects signal comprising a pulse train, the effects signals package being non-vehicle specific; and an antenna for directing the effects signal package modulated signal at a remote vehicle to disrupt the vehicle engine by affecting the vehicle engine management system.

Modern vehicle engines are controlled by electronic components, sensors and computer systems. The effects signal package modulated signal disrupts the operation of an engine management system, such as fuel delivery functions and/or timing, to stop the engine or otherwise impair its operation. The effects signals package comprises a plurality of respective effects signals and is not tailored to a particular vehicle type or model as different effects signals have different effectiveness against a target vehicle. Thus, the effects signals package may prove successful in affecting an engine system for a variety of vehicle types, enabling a target vehicle to be disabled without prior knowledge of the vehicle type or model. There is no need for the vehicle disabling apparatus or an operator to select a specific pulse shape or other radiation characteristic dependent on the vehicle identity, enabling fast deployment. Vehicle misidentification is not an issue and the vehicle disabling apparatus may be used even when the target vehicle is difficult to identify because of distance, speed, environmental conditions or other factors.

An apparatus in accordance with the invention may be used to halt and/or disable suspect vehicles which are targeted by the operators such as law enforcement officers and security services. It may be used for applications such as check point control, high value asset protection, and maritime coastguard purposes for action against boats.

The number of effects signals included in an effects signals package could be up to several tens or more but up to five may be effective. The time available to engage with the target may be relevant in some circumstances, as typically a larger number of effects signals may be used over a longer time duration.

In an embodiment of the invention, the effects signals package comprises a series of effects signals and respective pulse trains of the effects signals have different pulse widths and/or pulse repetition frequencies and/or pulse groupings. The effects signals may be in a pre-determined given order in the effects signal package or may be in a random or in a pseudo-random order. In an embodiment, the effects signals package may consist of one iteration of each effects signal.

In one embodiment, the pulse widths may be in the range of 100 nanoseconds to 10 microseconds although pulse widths outside this range may be used, for example. In one embodiment, a pulse width in the range of 0.5 microseconds to 2 microseconds is employed.

The pulse repetition frequency (PRF) may in one embodiment be in the range of 10s of hertz to a few kilohertz, for example 50 Hz to 2 kHz. Other embodiments may use other frequency ranges.

In an embodiment, one or more effects signals comprise pulses grouped in groups of 1 to 20 pulses. Where pulses are grouped in twenties, 20 pulses with a pulse width of 0.5 microseconds have a total duration of 10 microseconds. However, more than 20 pulses may be used in other embodiments. The pulse group frequency may be, for example, in the range of 50 kHz to 1 MHz.

In an embodiment, one or more of the effects signals are repeated within the effects signal package. The effects signals may be repeated with the same order or in a different predetermined order or random order or in a pseudo-random order.

In an embodiment of the invention, the effects signal package modulated signal is transmitted in a single burst of high frequency energy. In one embodiment, the burst is repeatable at will.

In an embodiment of the invention, the antenna is arranged to launch the modulated signal with a vertically orientated electric field polarization as this has been found to be particularly effective. However, in another embodiment, another polarization may be used such as horizontal or circular polarisation.

In an embodiment of the invention, the high frequency signal has a peak power of greater than 1 MW. In another embodiment, the source has an output power of greater than 10 MW. In an embodiment, the output power is within the range of 1 MW to 5 MW. This enables a target vehicle to be disabled at useful ranges without harming its occupants or bystanders or causing permanent damage to the vehicle.

In an embodiment of the invention, the frequency of the source is in one of the bands 1-2 GHz and 2-4 GHz. The actual frequency of operation has a narrow bandwidth, typically less than 3 MHz. By using a very narrow and controlled single frequency system, unwanted radio frequency 'noise' is almost entirely eliminated thus minimizing interference with other systems.

In one embodiment of the invention, the source of high power radio frequency radiation is a magnetron. In other embodiments, the source is a klystron, a solid-state source of microwave radiation or some other device.

Apparatus in accordance with the invention may include a control unit which supplies control signals to the modulator and receives signals from an operator interface. In another embodiment, there may be no need for an operator interface, for example, if the vehicle disabling apparatus is incorporated into an automated arrangement, for example, at a toll booth or checkpoint.

The vehicle disabling apparatus may include a store for storing information concerning the effects signal package and an input for receiving updated effects signal package information, or updated effects signal information, for storing in the store. The input may be arranged to receive an updated effects signal package as a download or carried on portable storage medium, for example. Thus individual effect signals and/or an updated effects signal package can be added to the store as they are improved or new ones are defined. This provides some future proofing and allows the apparatus to be updated as vehicle engine management systems change and advance.

A set of effects signal packages may be included in the vehicle disabling apparatus. A selector then selects an effects signal package for use from a plurality of effects signal packages available from the set. This may be carried out automatically or by an operator.

In one embodiment of the invention, the frequency of the source is user-selectable within a predefined frequency band. This can be advantageous in configuring the apparatus for use in a particular territory taking into account local spectrum management requirements and thus minimising interoperability problems.

In one embodiment, the apparatus is adapted to be vehicle mounted or transported. Use of the invention permits a compact build to be achieved, for example, because the magnetron and antenna can be arranged to produce a closely defined output pulse at relatively low power levels whilst still being effective. Thus individual components may be less bulky than might otherwise be the case.

According to a second aspect of the invention, a method for remotely disabling a vehicle having an engine includes generating a high frequency signal from a high frequency source; applying an effects signals package to modulate the high frequency signal, the effects signal package comprising a plurality of respective effects signals and each effects signal comprising a pulse train, the effects signals package being non-vehicle specific; and directing the effects signal package modulated signal at a remote vehicle to be disabled to disrupt the vehicle engine by affecting the vehicle engine management system.

BRIEF DESCRIPTION OF THE DRAWINGS

Some embodiments of the present invention will now be described by of example only, and with reference to the accompanying drawings, in which.

DETAILED DESCRIPTION

Figure 1:
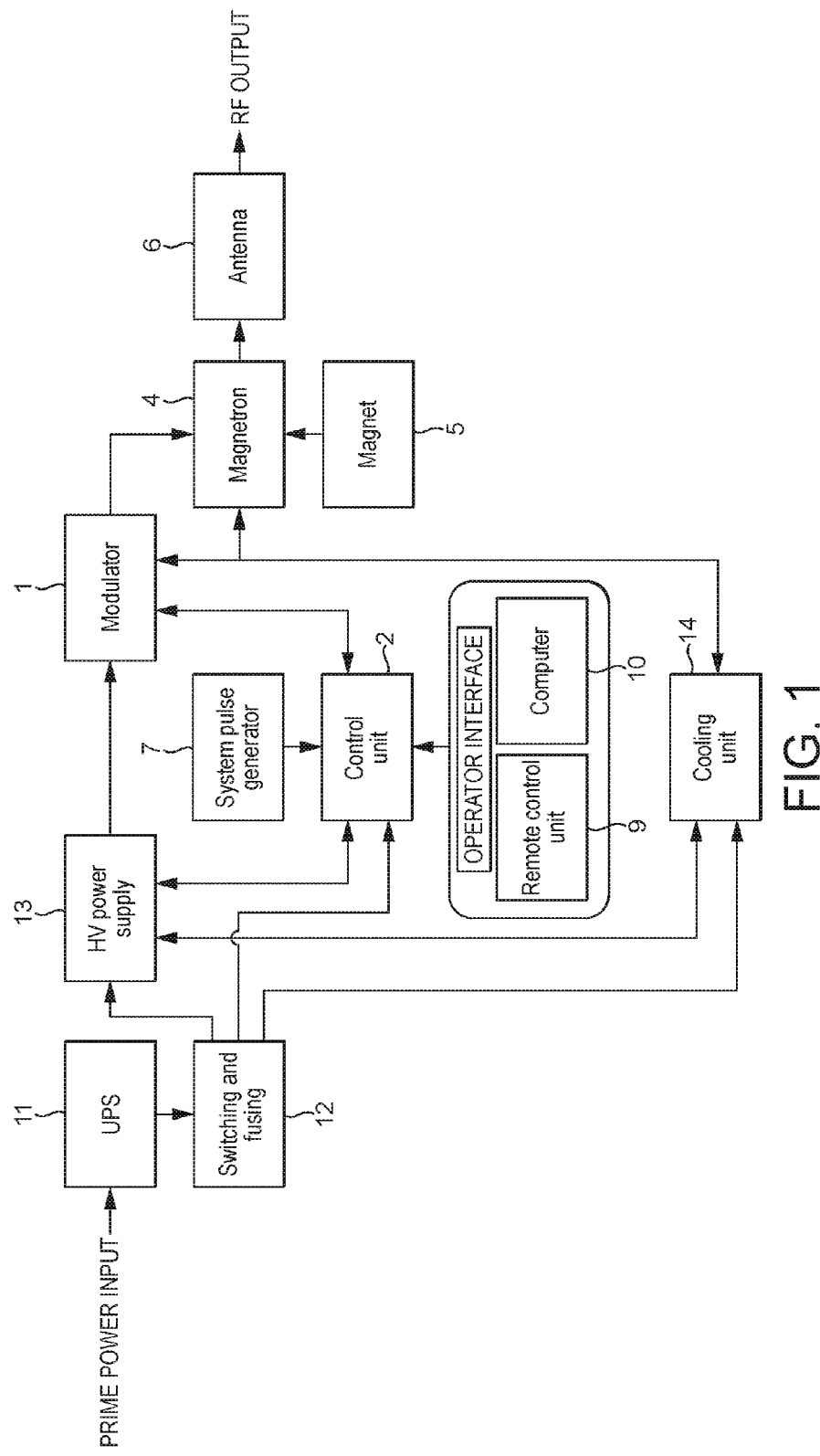
FIG. 1 schematically illustrates a vehicle disabling apparatus in accordance with the invention.

With reference to FIG. 1, a vehicle disabling apparatus includes a modulator 1 which receives a dc input from a high voltage power supply 13 and converts it into a pulse train output. The modulator output is applied to a magnetron 4. The magnetron 4 has a magnet 5 to provide the magnetic field which is essential to its operation. In this apparatus, the magnetron operating frequency is 3 GHz and has a narrow bandwidth. The magnetron output power is 5 MW. The magnetron 4 converts the applied electrical input pulses into RF output pulses which are then launched by an antenna 6. The antenna 6 is configured to provide a spatially narrow beam that can be directed towards a target vehicle to be disabled. The antenna 6 is arranged to launch the modulated signal with a vertically orientated electric field polarization.

The modulator 1 generates a series of effects signals that together make up an effects signal package. In this embodiment, each effects signal consists of a series of pulses having a pulse width, pulse repetition frequency and pulse grouping combination that is different to those of the other effects signals. In this embodiment, five effects signals included in an effects signals package but in other embodiments, a different number of effects signals may be included.

The effects signals are combined in series such the effects signals package includes several instances of each effects signal. The effects signals package is modulated on the magnetron output, a single effects signal package being transmitted in a single burst of RF energy. In other embodiments, several instances of the effects signals package are modulated on a single output burst of RF energy.

The effects signals may be combined in other ways to arrive at the effects signals package. For example, each effects signal may consist of a single pulse and the single pulses are of respective different pulse widths to provide the effects signals package modulated magnetron output. In another effects signals package, each effects signal consists of a series of pulses having a pulse width and pulse repetition frequency combination that is different to those of the other effects signals. The effects signals are combined in series and repeated only once such the effects signals package includes one instance of each effects signal. In another effects signals package, several instances of some of each effects signal are included.

Figure 2:
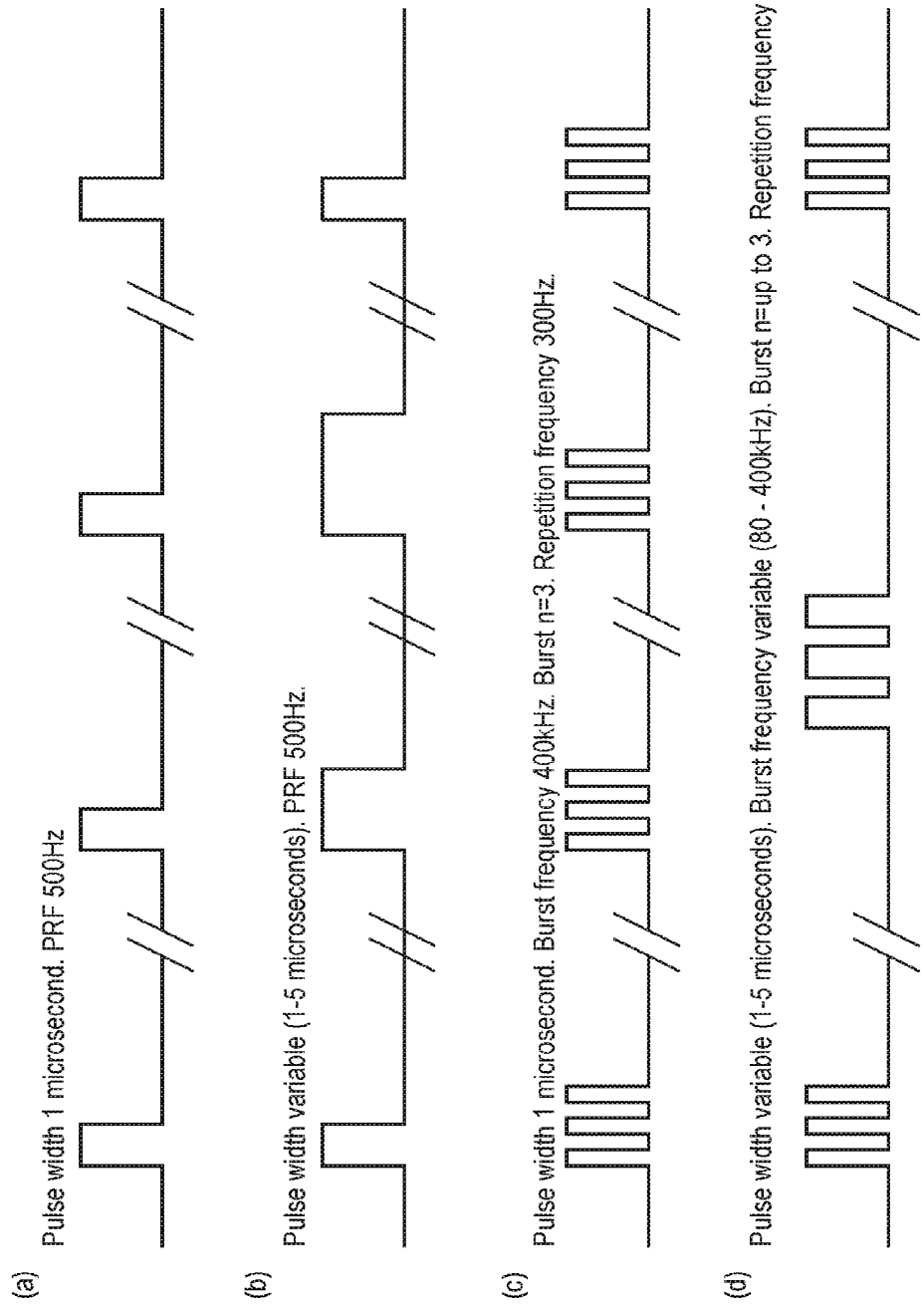
FIGS. 2(a) to 2(d) schematically illustrate different effects signals included in an effects signals package used in the apparatus of FIG. 1.
Figure 3:
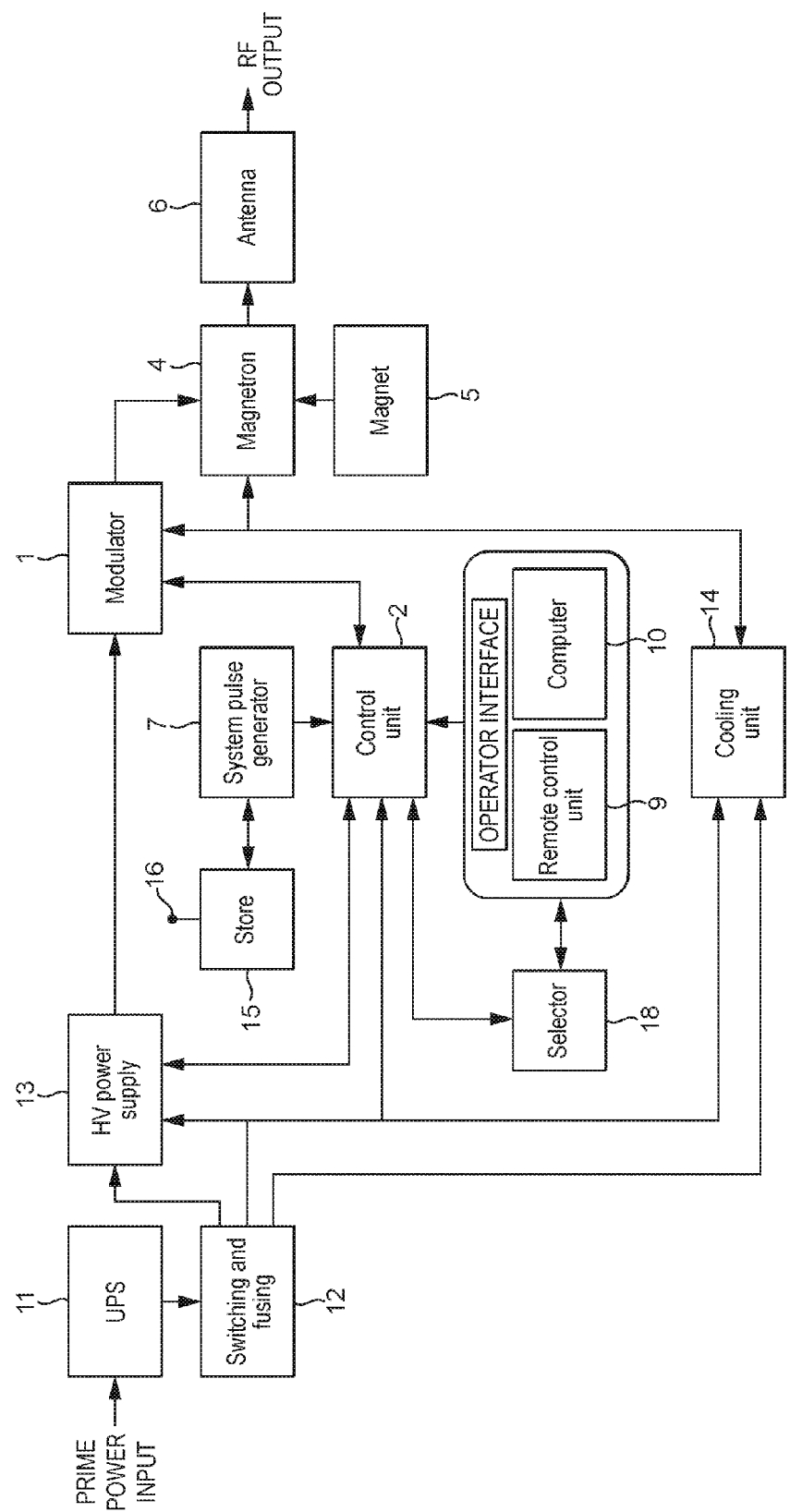
FIG. 3 schematically illustrates another vehicle disabling apparatus in accordance with the invention with like reference used for like parts.
Figure 4:
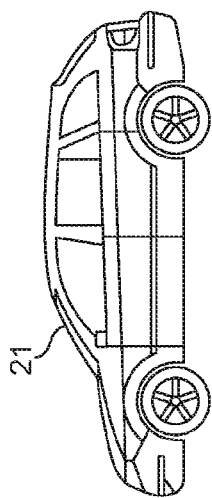
FIG. 4 schematically illustrates the apparatus of FIG. 1 or FIG. 3 in use.
Figure 4:
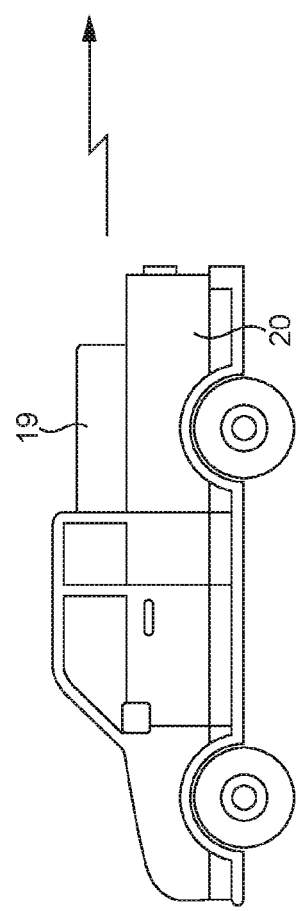

FIGS. 2(a) to 2(d) illustrate different effects signals. In FIG. 2(a), an effects signal has a series of pulses with a pulse width of 1 microsecond and a PRF of 500 Hz. In FIG. 2(b) an effects signal comprises a series of pulses with a variable pulse width in the range of 1 to 5 microseconds and a PRF of 500 Hz. In FIG. 2(c), an effects signal comprises a series of pulses with a pulse width of 1 microsecond, a group burst frequency of 400 kHz, with three pulses grouped in each group burst and a repetition frequency of 300 Hz. In FIG. 2(d), an effects signal comprises a series of pulses with variable pulse widths of 1 to 5 microseconds, a variable group burst frequency of from 80 to 400 kHz, with three pulses in each group burst and a variable repetition frequency from 50 to 300 Hz.

The modulator 1 receives an input from control unit 2 which accesses the appropriate pulse waveform from a pre-programmable system pulse generator 7. The control unit 2 provides an interface between operating commands and active system parts. It also provides background housekeeping and system performance monitoring.

An operator interface 8 includes a remote control unit interface 9 and a computer interface 10. The remote control unit interface 9 is a simple electro-mechanical interface with switches and lamps. The computer interface 10 includes a graphical user interface (GUI) for use by an operator. The interface in this embodiment thus permits remote operation or direct control by a local operator depending on what set up is required.

In other embodiments, the operator interface 8 may be redundant or omitted, for example, in cases where the vehicle disabling apparatus is automatically controlled, for example by an automated authentication system which may interface directly with the control unit 2.

The vehicle disabling apparatus includes an uninterruptable power supply (UPS) 11 which receives prime input power. The prime input power may be received from the alternator of a vehicle on which the apparatus is mounted. The UPS provides conversion of prime power into three phase ac required by the vehicle disabling apparatus. If three phase ac is available from the mains or a generator, this will bypass the UPS conversion. The UPS is not essential for a vehicle disabling apparatus in accordance with the invention and may not be required in other embodiments.

The output of the UPS 11 is applied to a switching and fusing unit 12 which protects the system from system over-current using a series of circuit breakers and fuses. A safety circuit may be wired into the switching and fusing unit 12. The three phase ac is applied to the high voltage power supply 13 which converts the ac into a stable high voltage dc supply and applies it to the modulator 1 and the control unit 2. The three phase ac is also supplied directly to the control unit 2 and also to a cooling unit 14. The cooling unit 14 manages heat losses within the system at the high voltage power supply 13, the modulator 1 and the magnetron 4.

In the vehicle disabling apparatus shown in FIG. 1, the operating frequency of the magnetron 4 may be changed within a predefined frequency band to comply with local regulations regarding spectrum usage. This may be done by the operator of the apparatus or set prior to deployment in the field.

In other vehicle disabling apparatus, the pulse widths may be in the range of 100 nanoseconds to 10 microseconds. In one embodiment, a pulse width in the range of 0.5 microseconds to 2 microseconds is employed. The pulse repetition frequency (PRF) may in one embodiment be in the range of 10s of hertz to a few kilohertz, for example 50 Hz to 2 kHz.

In another embodiment, some effects signals may have pulses grouped in groups of 1 to 20 pulses. Where pulses are grouped in twenties, 20 pulses with a pulse width of 0.5 microseconds have a total duration of 10 microseconds. However, more than 20 pulses may be used in other embodiments.

With reference to FIG. 5, another vehicle disabling apparatus is similar to that shown in FIG. 1. However, in this case the magnetron 4 operates at 1.5 GHz.

In this system the system pulse generator 7 is connected to a store 15 which stores information concerning the effects signal package and has an input 16 for receiving updated effects signal package information, or updated effects signal information, for storing in the store 15. The system pulse generator 7 accesses information from the store 15 when updates are required. In another arrangement, updates are applied directly to the system pulse generator 7.

The vehicle disabling apparatus also includes a selector 18 for selecting an effects signal package for use from a plurality of effects signal packages available from the store 16. In one arrangement, the selector 18 is controlled via the operator interface 8. Each effects signal package is non-vehicle specific but having two or more available may give additional flexibility which may be useful in some situations.

With reference to FIG. 6, a vehicle disabling apparatus 19 as described with reference to in FIG. 1 or to FIG. 5, is mounted on a vehicle 20. As a target vehicle 21 to be disabled approaches, an operator uses the operator interface 8 to initiate the apparatus and an effects signal package modulated output pulse is directed towards the target vehicle. The progression through the effects signals modulation affects the engine management system of the target vehicle causing the engine to falter and then stall so that the vehicle comes to a halt safely. The operator continues to deploy the vehicle disabling apparatus 19 and thus prevent the target vehicle driver from re-starting the engine.

Experimental tests carried out with a vehicle disabling apparatus in accordance with the invention based on a sample of 23 vehicles types from 14 different manufacturers have shown that this apparatus offers a viable alternative to traditional lethal deterrents as a means of stopping target vehicles by remotely interfering with the target vehicle engine management system bringing the vehicle to a stop with a potential success rate of circa 80%. As it is a narrow band microwave based apparatus, it is possible to direct the effect only on the intended vehicle, minimizing the potential risk of collateral damage other vehicles, innocent bystanders, or enforcement personnel.

Other scenarios in which the vehicle disabling apparatus may be used include static installation asset protection. For example, vehicles may be channelled through a check point. When challenged, if they do not stop the vehicle disabling apparatus can be energised. Another use is with mobile asset/convoy protection. If a hostile vehicle approaches a motorcade, the vehicle disabling apparatus may be energised to maintain a safe gap between the approaching car and the protected asset.

The vehicle disabling apparatus may be deployed to remotely stop waterborne vessels, in particular high performance speedboats fitted with large outboard engines that are threatening other vessels or coastline security.

A vehicle disabling apparatus in accordance with the invention is an electromagnetic based system, which produces a series of high power radio frequency pulses that are directed on to the intended target vehicle from a distance to couple into the vehicle's electronic control system thereby initiating an engine management fault and ultimately bringing the vehicle to a stop. It offers good success rate, safety and large magazine size, which potentially may be unlimited depending on configuration.

The functions of the various elements shown in the Figure(s), including any functional blocks labelled as "units", may be provided through the use of dedicated hardware as well as hardware capable of executing software in association with appropriate software. Units and other components may implicitly include, without limitation and where appropriate, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A vehicle disabling apparatus for remotely disabling a vehicle having an engine comprising:
   a source of high frequency energy for generating a high frequency signal;
   a modulator for modulating the high frequency signal by applying an effects signals package to provide an effects signal package modulated signal, the effects signal package comprising a plurality of respective different effects signals and each effects signal comprising a pulse train, the effects signals package being non-vehicle specific; and
   an antenna for directing the effects signal package modulated signal at a remote vehicle to disrupt the vehicle engine by affecting its vehicle engine management system.

2. The apparatus as claimed in claim 1 wherein the effects signals package comprises a series of effects signals and respective pulse trains of the effects signals have at least one of: different pulse widths; different pulse repetition frequencies; and different pulse groupings.

3. The apparatus as claimed in claim 1, wherein the effects signal package modulated signal is transmitted in a single burst of high frequency energy.

4. The apparatus as claimed in claim 1, wherein the antenna is arranged to launch the modulated signal with a vertically orientated electric field polarization.

5. The apparatus as claimed in claim 1, wherein the antenna is arranged to launch the modulated signal with a horizontally orientated electric field polarization.

6. The apparatus as claimed in claim 1, wherein the high frequency signal has a peak power of greater than 1 MW.

7. The apparatus as claimed in claim 6, wherein the high frequency signal has a peak power within a range 1 MW to 5 MW.

8. The apparatus as claimed in claim 1, wherein a frequency of the source is in one of bands 1-2 GHz and 2-4 GHZ.

9. The apparatus as claimed in claim 1, wherein an actual frequency of operation has a bandwidth of less than or equal to 3 MHz.

10. The apparatus as claimed in claim 1, wherein pulse trains of the effects signals have at least one of: pulse widths in the range 100 nanoseconds to 10 microseconds; pulse repetition frequencies in a range 50 Hz to 2 kHz; and pulse groupings in the range 1 to 20 pulses in a group.

11. The apparatus as claimed in claim 1, wherein the effects signal package comprises up to several tens of respective effects signals.

12. The apparatus as claimed in claim 11, wherein the effects signal package comprises up to five respective effects signals.

13. The apparatus as claimed in claim 1, wherein the source is a magnetron.

14. The apparatus as claimed in claim 1, and including a control unit operative to supply control signals to the modulator and receive signals from an operator interface.

15. The apparatus as claimed in claim 1, and including a storage medium for storing information concerning the effects signal package and an input for receiving updated effects signal package information, or updated effects signal information, for storing in the storage medium.

16. The apparatus as claimed in claim 1, and including a set of effects signal packages and a selector for selecting an effects signal packages for use from a plurality of effects signal packages available from the set.

17. The apparatus as claimed in claim 1, wherein a frequency of the source is user-selectable within predefined frequency band.

18. The apparatus as claimed in claim 1, wherein the effects signals are in one of: a pre-determined given order in the effects signal package; a random order in the effects signal package; and in a pseudo-random order in the effects signal package.

19. The apparatus as claimed in claim 1, wherein the effects signals package consists of one iteration of each effects signal.

20. The apparatus as claimed in claim 1, wherein one or more of the effects signals are repeated within the effects signal package.

21. The apparatus as claimed in claim 20, wherein the effects signals are repeated in one of: the same order; a different predetermined order; a random order; and a pseudo-random order.

22. The apparatus as claimed in claim 1, wherein the effects signal package modulated signal is transmitted in a single burst of high frequency energy, repeated at will.

23. The apparatus as claimed in claim 1 adapted to be vehicle mounted or transported.

24. A method for remotely disabling a vehicle having an engine including:
   generating a high frequency signal from a high frequency source;
   applying an effects signals package to modulate the high frequency signal to provide an effects signal package modulated signal, the effects signal package comprising a plurality of respective different effects signals and each effects signal comprising a pulse train, the effects signals package being non-vehicle specific; and
   directing the effects signal package modulated signal at a remote vehicle to be disabled to disrupt the vehicle engine by affecting its vehicle engine management system.

25. The method as claimed in claim 24 wherein the effects signals package comprises a series of effects signals and respective pulse trains of the effects signals have different pulse widths and/or pulse repetition and/or pulse groupings.

26. The method as claimed in claim 24, wherein the effects signal package modulated signal is transmitted in a single burst of high frequency energy.

27. The method apparatus as claimed in claim 24, including the antenna launching the modulated signal with a vertically orientated electric field polarization.

28. The method as claimed in claim 24, wherein the high frequency signal has a peak power of greater than 1 MW.

29. The method as claimed in claim 24, wherein the high frequency signal has a peak power in a range of 1 MW to 5 MW.

30. The method as claimed in claim 24, wherein a frequency of the source is in one of bands 1-2 GHZ and 2-4 GHz.

31. The method as claimed in claim 24, wherein the source is a magnetron.

32. The method as claimed in claim 24, including a storage medium for storing the effects signal package and including receiving updated effects signal package information, or an updated effects signal information, and storing the updated effects signal package or an updated effects signal in the storage medium.

33. The method as claimed in claim 24, including a set of effects signal packages and a selector for selecting an effects signal packages for use from a plurality of effects signal packages available from the set.

34. The method as claimed in claim 24, wherein a frequency of the source is user-selectable within a pre-defined frequency band.

35. The method as claimed in claim 24, wherein the effects signals are in one of: a pre-determined given order in the effects signal package; a random order in the effects signal package; and in a pseudo-random order in the effects signal package.

36. The method as claimed in claim 24, wherein the effects signals package consists of one iteration of each effects signal.

37. The method as claimed in claim 24, wherein one or more of the effects signals are repeated within the effects signal package.

38. The method as claimed in claim 37, wherein the effects signals are repeated in one of: the same order; a different predetermined order; a random order; and a pseudo-random order.

39. The method as claimed in claim 24, wherein the effects signal package modulated signal is transmitted in a single burst of high frequency energy, repeated at will.

40. The method as claimed in claim 24, including transporting the apparatus on a vehicle.

\* \* \* \* \*